United States Patent
Linz et al.

(10) Patent No.: US 12,542,462 B2
(45) Date of Patent: Feb. 3, 2026

(54) LAMINATED CORE SET AND ROTOR HAVING LAMINATED CORE SET ATTACHED TO ROTOR SHAFT

(71) Applicant: Schaeffler Technologies AG & Co. KG, Herzogenaurach (DE)

(72) Inventors: Bernhard Linz, Wilhelmsdorf (DE); Philip Wurzberger, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 225 days.

(21) Appl. No.: 17/923,096

(22) PCT Filed: Apr. 28, 2021

(86) PCT No.: PCT/DE2021/100384
§ 371 (c)(1),
(2) Date: Nov. 3, 2022

(87) PCT Pub. No.: WO2021/239177
PCT Pub. Date: Dec. 2, 2021

(65) Prior Publication Data
US 2023/0344289 A1     Oct. 26, 2023

(30) Foreign Application Priority Data
May 26, 2020  (DE) .......................... 102020114008.8

(51) Int. Cl.
H02K 1/276     (2022.01)
(52) U.S. Cl.
CPC ......... H02K 1/276 (2013.01); *H02K 2201/06* (2013.01)

(58) Field of Classification Search
CPC ...... H02K 1/276; H02K 2201/06; H02K 1/28; H02K 1/27
(Continued)

(56) References Cited

U.S. PATENT DOCUMENTS

2015/0015107 A1*  1/2015  Blum .................... H02K 1/276
                                                   310/156.25

FOREIGN PATENT DOCUMENTS

| CN | 208190371 | 12/2018 |
| CN | 210404878 | 4/2020 |

(Continued)

OTHER PUBLICATIONS

DE102017011412A1 English translation (Year: 2024).*
(Continued)

*Primary Examiner* — Christopher M Koehler
*Assistant Examiner* — Viswanathan Subramanian
(74) *Attorney, Agent, or Firm* — Volpe Koenig

(57) ABSTRACT

A laminated core set for a rotor, having at least one first laminated core and at least one second laminated core, each having internal toothing for fastening to a rotor shaft and forming a magnet carrier. The magnet carriers have recesses for receiving magnets. A circumferential orientation is a relative position between the recesses and the internal toothing of a laminated core and the circumferential orientation of the first laminated core is different from the circumferential orientation of the second laminated core. A rotor for an electric machine is provided having such a laminated core set and a rotor shaft to which the laminated core set is attached such that the recesses of axially adjacent laminated cores are arranged rotated by a predetermined angular offset.

16 Claims, 1 Drawing Sheet

(58) Field of Classification Search
USPC .......................................................... 310/256
See application file for complete search history.

(56) References Cited

FOREIGN PATENT DOCUMENTS

| | | |
|---|---|---|
| DE | 102016212004 | 1/2018 |
| DE | 102017011412 | 6/2018 |
| DE | 102017011989 | 6/2018 |
| DE | 112018003941 | 5/2020 |
| EP | 3276801 | 1/2018 |
| JP | 2014236592 | 12/2014 |
| JP | 2020014368 A * | 1/2020 |

OTHER PUBLICATIONS

JP2020014368A English translation (Year: 2025).*
DE102016212004A1 English translation (Year: 2025).*
Spotts, "Design of Machine Elements", Fourth Edition, Prentice-Hall, pp. 126-131, 1971.
Wikipedia, Welle-Nabe-Verbindung, 2 pages, version from Jan. 3, 2018.
DIN 5471, Aug. 1, 1974.

* cited by examiner

LAMINATED CORE SET AND ROTOR HAVING LAMINATED CORE SET ATTACHED TO ROTOR SHAFT

CROSS-REFERENCE TO RELATED APPLICATIONS

This application is the U.S. National Phase of PCT Appln. No. PCT/DE2021/100384, filed Apr. 28, 2021, which claims the benefit of German Patent Appln. No. 10 2020 114 008.8, filed May 26, 2020, the entire disclosures of which are incorporated by reference herein.

TECHNICAL FIELD

The disclosure relates to a laminated core set for a rotor of an electric machine, in particular for a rotor of an electric motor of a motor vehicle drive train. Furthermore, the disclosure relates to a rotor for an electric machine, in particular for an electric motor of a motor vehicle drive train, having such a laminated core set and a rotor shaft to which the laminated core set is attached such that the recesses of axially adjacent laminated cores are arranged rotated relative to one another by a predetermined angular offset.

BACKGROUND

Rotors with helical rotor configurations are already known from the prior art, in which axially adjacent laminated cores are arranged rotated by a predetermined angular offset relative to one another. For example, DE 10 2016 212 004 A1 discloses a rotor for an electric machine, in particular for an electric motor for the traction drive of a motor vehicle with electric or hybrid drive, with a rotor shaft or a rotor carrier and a plurality of rotor laminated cores arranged thereon in a rotationally secure manner by means of a shaft-hub connection, wherein the shaft-hub connection is formed as a plug-in toothing, wherein adjacent rotor laminated cores are attached to the rotor shaft or the rotor carrier offset by at least one tooth distance and thus have an angular offset relative to one another.

However, the prior art has drawbacks, including in regard to manufacturing.

SUMMARY

It is therefore the object of the disclosure to avoid or at least to mitigate the disadvantages of the prior art. In particular, a (rotor) laminated core set and a rotor constructed therefrom for an electric motor are to be provided which is easy to manufacture, enables reliable torque transmission between the laminated cores and a rotor shaft, and ensures good running and acoustic properties of the electric motor. Now the helical rotor configuration can be produced without much effort and sufficient torque transmission can be ensured.

This object is achieved by the use of one or more of the features disclosed herein. Advantageous embodiments are described below and in the claims.

More precisely, the object is achieved by a (rotor) laminated core set for a rotor, which has at least a first laminated core having a plurality of rotor laminations stacked axially one above the other and at least a second laminated core having a plurality of rotor laminations stacked axially one above the other. The first laminated core has a (first) internal toothing, in particular a plug-in toothing, for fastening to a rotor shaft in a form-fitting manner secured against rotation. The second laminated core has a (second) internal toothing, in particular a plug-in toothing, for fastening to the rotor shaft in a form-fitting manner secured against rotation. Preferably, the internal toothings of the first laminated core and the second laminated core are constructed identically, for example in terms of their diameter and number of teeth. The first laminated core forms a (first) magnet carrier, which preferably has a plurality of recesses for receiving (permanent) magnets. The second laminated core forms a (second) magnet carrier, which preferably has a plurality of recesses for receiving (permanent) magnets.

A circumferential orientation is defined as a relative position, viewed in the circumferential direction, between the recesses and the internal toothing of a laminated core. The circumferential orientation of the first laminated core is different from the circumferential orientation of the second laminated core. This means, then, that the laminated cores are different in such a manner that when the internal toothings of the laminated cores are axially aligned, the recesses of the laminated cores have a circumferential offset from one another, i.e., are offset from one another/axially out of alignment. In other words, the recesses of the laminated cores are offset from one another, viewed in the circumferential direction, when the first laminated core is arranged in a first position on the rotor shaft by means of the internal toothing and when the second laminated core is arranged in a second position on the rotor shaft by means of the internal toothing. In other words, the laminated cores are designed differently with respect to the arrangement of the internal toothing, viewed in the circumferential direction, relative to the arrangement of the recesses, viewed in the circumferential direction.

This has the advantage that the laminated core set can be used to construct a rotor with a helical rotor configuration, wherein the helical rotor configuration can be easily produced by only a few different laminated cores and can be finely adjusted, in particular independently of the design of the internal toothing. This results in improved running and acoustic properties. Since the internal toothing is often produced in a separate manufacturing step, the plug-in toothings of the two laminated cores, which are arranged differently from one another, advantageously cause virtually no additional manufacturing costs.

According to a preferred embodiment, the circumferential orientation of the first laminated core and the circumferential orientation of the second laminated core can have an offset in the circumferential direction from one another that is different from a tooth distance or a multiple of the tooth distance of the internal toothing. This means that the angular offset of the helical rotor configuration is not dependent on a tooth distance or a module of the internal toothing, but can be set almost at will. This offers greater flexibility in the design of the internal toothing.

According to a further development of the preferred embodiment, the offset can be equal to half the tooth distance or the sum of a multiple of the tooth distance and half the tooth distance. This has the advantage that with only two different laminated cores an entire rotor (consisting of more than two laminated cores) can be constructed with a predetermined and, in particular, constant helical rotor configuration between axially adjacent laminated cores. In other words, the different arrangement of the internal toothing for the angular offset creates an intermediate step between the tooth distance or a multiple thereof, which allows for better adjustment of the magnet alignment.

According to a preferred embodiment, the laminated core set can have a plurality of first laminated cores each having an identical first lamination cross-section and a plurality of second laminated cores each having an identical second lamination cross-section, wherein the first lamination cross-section is different from the second lamination cross-section. This allows the number of common parts to be increased and the number of differently designed components to be reduced, thus minimizing manufacturing costs without having to accept restrictions in terms of the helical rotor configuration that can be realized.

According to an alternative embodiment, the laminated core set can have at least a third laminated core having a (third) internal toothing for fastening to the rotor shaft in a form-fitting manner secured against rotation and forming a magnet carrier constructed from a plurality of rotor laminations stacked axially one above the other, wherein the circumferential orientation of the third laminated core is different from the circumferential orientation of the first laminated core and different from the circumferential orientation of the second laminated core. This has the advantage that the additional laminated core means that the helical rotor configuration can be produced in a simple manner by using only a few different laminated cores and can be adjusted even more finely, in particular independently of the design of the internal toothing.

According to the alternative embodiment, the circumferential orientation of the first laminated core and the circumferential orientation of the second laminated core can have a first offset from one another corresponding to one third of the tooth distance, and the circumferential orientation of the first laminated core and the circumferential orientation of the third laminated core can have a second offset from one another corresponding to two thirds of the tooth distance. This means that the angular offset of the helical rotor configuration does not have to correspond exactly to one tooth distance (or a multiple thereof) or exactly to half of a tooth distance (or a multiple thereof), but can be adjusted even more flexibly in steps corresponding to one third of the tooth distance.

The object is also achieved by a rotor for an electric machine. The rotor has a laminated core set as described and a rotor shaft. The laminated core set is attached to the rotor shaft in such a way that the recesses of axially adjacent laminated cores are arranged rotated by a predetermined angular offset. The laminated core set is thus attached to the rotor shaft secured against rotation in a form-fitting manner stacked axially one above the other by means of the internal toothings of the individual laminated cores. Thus, a rotor with a helical rotor configuration can be provided that can be manufactured at low cost and ensures reliable torque transmission.

According to a preferred embodiment of the rotor, the predetermined angular offset can correspond to the offset between the circumferential orientation of the first laminated core and the circumferential orientation of the second laminated core. This means, therefore, that a desired angular offset is taken into account when manufacturing the differently arranged internal toothings.

According to a preferred embodiment of the rotor, a plurality of first laminated cores and a plurality of second laminated cores are regularly alternately attached to the rotor shaft in the axial direction, wherein the plurality of first laminated cores and/or the plurality of second laminated cores are each arranged rotated by a tooth distance or a multiple of the tooth distance of the internal toothing of the first laminated core in the circumferential direction. This means that the laminated cores formed with the same lamination (cross) section are arranged rotated relative to one another by the tooth distance or a multiple thereof, and the laminated cores formed with the different lamination (cross) section are arranged rotated relative to one another by the offset caused by the different circumferential orientations.

According to the preferred embodiment, the rotation of the plurality of first laminated cores with respect to one another and/or the rotation of the plurality of second laminated cores with respect to one another can correspond to twice the offset between the first circumferential orientation and the second circumferential orientation. This results in a constant helical rotor configuration with a constant angular offset over the entire axial extension of the rotor.

In other words, the disclosure relates to a rotor for an electric machine. Usually, electric machines or electric motors used to drive motor vehicles have a stator and a rotor rotatably mounted therein. The stator can be laminated, i.e., assembled from individual stator laminations combined into laminated cores. The rotor can be laminated, i.e., assembled from individual rotor laminations combined into laminated cores. The rotor laminations and a rotor shaft of the rotor are designed in such a way that the rotor laminations can be mounted on a rotor shaft in a rotationally secure manner. A form-fitting shaft-hub connection, in particular a plug-in toothing, is often used for this purpose between the rotor laminations/rotor laminated cores and the rotor shaft. To improve the running and acoustic properties of the electric motor, it is advantageous for the rotor to have a so-called helical rotor configuration, which means that a plurality of laminated cores are arranged on the rotor shaft with an angular offset. Advantageously, adjacent rotor laminated cores have two plug-in toothings arranged differently from one another, whereby adjacent rotor laminated cores have an angular offset from one another, in particular in the area of permanent magnets received in the rotor laminations, resulting in the helical rotor configuration.

According to a preferred embodiment, the rotor can have a plurality of rotor laminated cores attached to the rotor shaft, which are arranged on the rotor shaft with an axial spacing and rotation. For example, no rotation is implemented on the rotor shaft from a first rotor laminated core to a second rotor laminated core, but a rotation is implemented by a toothing arranged rotated in the lamination section of the second rotor laminated core. A third rotor laminated core is identical in lamination section to the first rotor laminated core and is arranged with a radial rotation by a specific number of teeth relative to the first rotor laminated core. Thus, by using two different lamination sections and by rotating the laminated cores relative to one another, an angular offset is achieved between all laminated cores in the rotor. In particular, magnet pockets arranged in the laminated cores are arranged by the arrangement of the laminated cores in such a way that the magnet pockets do not align with rotor laminated cores that are axially adjacent/arranged one behind the other, but are rotated by a certain bevel angle with respect to one another, thus creating the helical rotor configuration.

BRIEF DESCRIPTION OF THE DRAWINGS

The disclosure is explained below with the aid of drawings. In the figures.

DETAILED DESCRIPTION

Figure 1:
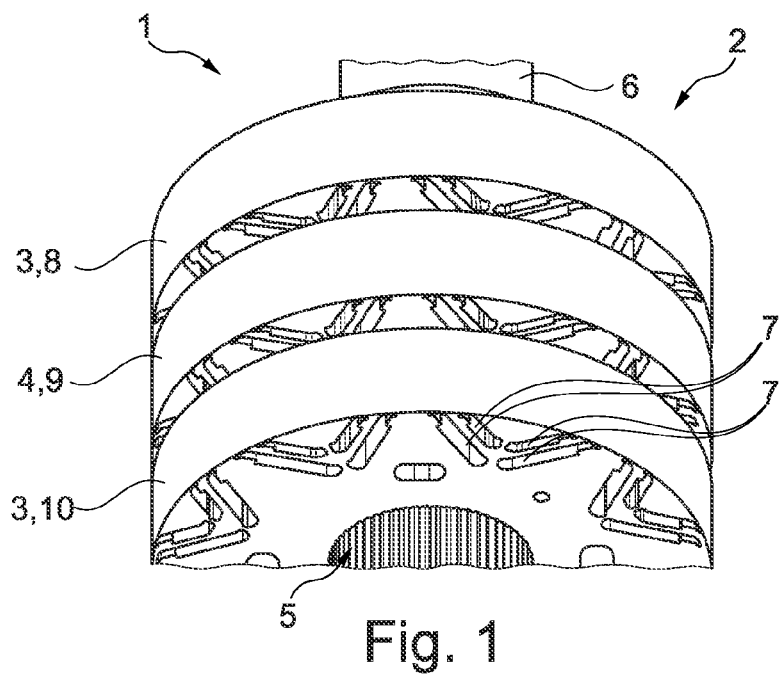
FIG. 1 shows a perspective view of a rotor with a laminated core set and a rotor shaft.

The figures are merely schematic in nature and are intended solely for the purpose of helping to understand the disclosure. The same elements are provided with the same reference numerals.

FIG. 1 shows a laminated core set 1 for a rotor 2 of an electric machine. The laminated core set has a first laminated core 3 and a second laminated core 4. The first laminated core 3 and the second laminated core 4 each have an internal toothing 5, in particular a plug-in toothing, for fastening to a rotor shaft 6, in particular on an external toothing of the rotor shaft 6, in a form-fitting manner secured against rotation. The first laminated core 3 and the second laminated core 4 each form a magnet carrier constructed from a plurality of rotor laminations stacked axially one above the other. The magnet carriers each have a plurality of recesses 7 for receiving magnets.

In the following, a circumferential orientation is defined as a relative position, viewed in the circumferential direction, between the recesses 7 and the internal toothing 5 of a respective (first or second) laminated core 3, 4. This means that a circumferential position of the recesses 7 and thus of the magnets to be received therein relative to the rotor shaft 6 is determined by the arrangement of the internal toothing 5. In the laminated core set 1 shown, the circumferential orientation of the first laminated core 3 is different from the circumferential orientation of the second laminated core 4. This results in the recesses 7 of the first laminated core 3 being fixed in a first circumferential position on the rotor shaft 6 by means of the internal toothing 5, and the recesses 7 of the second laminated core 4 being fixed in a second circumferential position (different from the first circumferential position) on the rotor shaft 6 by means of the internal toothing 5. The circumferential orientation of the first laminated core 3 and the circumferential orientation of the second laminated core 4 have an offset in the circumferential direction from one another that is different from a tooth distance or a multiple of the tooth distance of the internal toothing 5. In particular, the offset is equal to half the tooth distance or the sum of a multiple of the tooth distance and half the tooth distance.

The laminated core set 1 can have a plurality of first laminated cores 3, each having an identical first lamination cross-section. The laminated core set 1 can have a plurality of second laminated cores 4, each having an identical second lamination cross-section. In this regard, the first lamination cross-section is different from the second lamination cross-section.

In the embodiment shown in FIG. 1, for exemplary understanding, the rotor 2 is constructed from three laminated cores arranged in an axially stacked manner (a first laminated core 3, a second laminated core 4, and a first laminated core 3). The recesses 7 of an axially rearmost laminated core 8, which is a first laminated core 3, are arranged rotated by the offset in the circumferential direction relative to the recesses 7 of an axially central laminated core 9, which is a second laminated core 4. The rotation between the axially rearmost laminated core 8 and the axially central laminated core 9 results from the use of the different lamination cross-sections. The recesses 7 of the axially central laminated core 9, which is a second laminated core 4, are arranged rotated by the offset in the circumferential direction relative to the recesses 7 of an axially foremost laminated core 10, which is a first laminated core 3. The rotation between the axially central laminated core 9 and the axially rearmost laminated core 10 results from the use of the different lamination cross-sections. The recesses 7 of the axially rearmost laminated core 8, which is a first laminated core 3, are arranged rotated by twice the offset in the circumferential direction relative to the recesses 7 of the axially foremost laminated core 10, which is a first laminated core 3, or are arranged rotated by a tooth distance or multiple of the tooth distance of the internal toothing 5. The rotation between the axially rearmost laminated core 8 and the axially foremost laminated core 10 results from the use of the same lamination cross-sections, wherein the axially foremost laminated core 10 is arranged with a rotation by a certain number of teeth relative to the axially rearmost laminated core 8.

Figure 2:
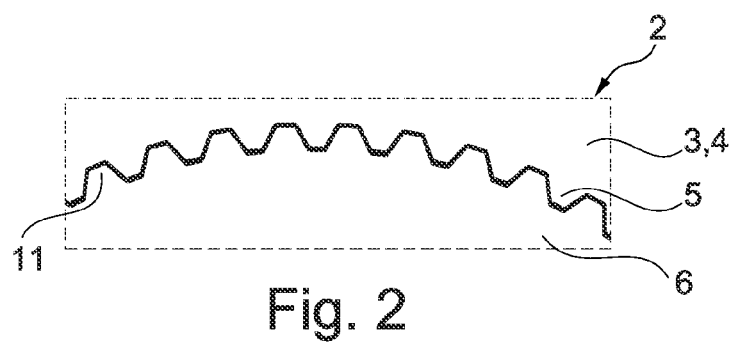
FIG. 2 shows a connection between the laminated core set and the rotor shaft.

FIG. 2 shows a schematic side view of the internal toothing 5 engaging an external toothing 11 of the rotor shaft 6. The internal toothings 5 of the first laminated core 3 and the second laminated core 4 are attached to the rotor shaft 6 in axial alignment. The internal toothings 5 of the first laminated core 3 and the second laminated core 4 are of identical design, i.e., same diameter, same number of teeth, same tooth distance, so that they can engage in a form-fitting manner secured against rotation in the external toothing 11 of the rotor shaft 6.

Figure 3:
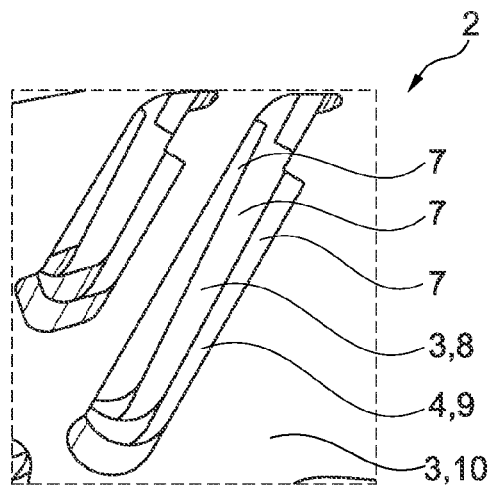
FIG. 3 shows a detailed section of a perspective view of the rotor.

The rotor 2 is constructed to comprise the laminated core set 1 and the rotor shaft 6, wherein the laminated core set 1 is attached to the rotor shaft 6 in the axial direction in such a way that the recesses 7 of axially adjacent laminated cores 3, 4 are arranged rotated by a predetermined angular offset (cf. FIG. 3). In particular, the predetermined angular offset corresponds to the offset between the circumferential orientation of the first laminated core 3 and the circumferential orientation of the second laminated core 4. Preferably, a plurality of first laminated cores 3 and a plurality of second laminated cores 4 are regularly alternately attached to the rotor shaft 6 in the axial direction. The plurality of first laminated cores 3 are each arranged rotated by a tooth distance or a multiple of the tooth distance of the internal toothing 5 in the circumferential direction. The plurality of second laminated cores 4 are each arranged rotated by a tooth distance or a multiple of the tooth distance of the internal toothing 5 in the circumferential direction. The rotation of the plurality of first laminated cores 3 with respect to one another corresponds to twice the offset between the circumferential orientation of the first laminated core 3 and the circumferential orientation of the first laminated core 4. The rotation of the plurality of second laminated cores 4 with respect to one another corresponds to twice the offset between the circumferential orientation of the first laminated core 3 and the circumferential orientation of the first laminated core 4.

As in FIG. 1, the rotor 2 in the embodiment shown in FIG. 3, for exemplary understanding, is constructed from three laminated cores arranged in an axially stacked manner (a first laminated core 3, a second laminated core 4, and a first laminated core 3). The recess 7 of the axially rearmost laminated core 8, which is a first laminated core 3, is arranged rotated by the offset in the circumferential direction relative to the recess 7 of the axially central laminated core 9, which is a second laminated core 4. The recess 7 of the axially central laminated core 9, which is a second laminated core 4, is arranged rotated by the offset in the circumferential direction relative to the recess 7 of the axially foremost laminated core 10, which is a first laminated core 3. The recess 7 of the axially rearmost laminated core 8, which is a first laminated core 3, is arranged rotated by twice the offset in the circumferential direction relative to the recess 7 of the axially foremost laminated core 10, which is a first laminated core 3, or is arranged rotated by a tooth distance or multiple of the tooth distance of the internal toothing 5.

Alternatively, although not shown, the rotor 2 could have at least a third laminated core having internal toothing for fastening to the rotor shaft in a form-fitting manner secured against rotation and forming a magnet carrier constructed from a plurality of rotor laminations stacked axially one above the other, wherein the circumferential orientation of the third laminated core is different from the circumferential orientation of the first laminated core 3 and different from the circumferential orientation of the second laminated core 4. Accordingly, the circumferential orientation of the first laminated core 3 and the circumferential orientation of the second laminated core 4 would have a first offset from one another corresponding to one third of the tooth distance, and the circumferential orientation of the first laminated core 3 and the circumferential orientation of the third laminated core would have a second offset from one another corresponding to two thirds of the tooth distance.

LIST OF REFERENCE NUMERALS

1 Laminated core set
2 Rotor
3 First laminated core
4 Second laminated core
5 Internal toothing
6 Rotor shaft
7 Recess
8 Axially rearmost laminated core
9 Axially central laminated core
10 Axially foremost laminated core
11 External toothing

The invention claimed is:

1. A laminated core set for a rotor of an electric machine, the laminated core set comprising:
    a first laminated core;
    a second laminated core;
    the first and second laminated cores each having identical internal toothing in an assembled state configured for fastening to a rotor shaft in a form-fitting manner secured against rotation and forming a magnet carrier constructed from a plurality of rotor laminations stacked axially one above the other; the magnet carriers have recesses for receiving magnets; and
    wherein the first laminated core has a circumferential orientation, which is a relative position, viewed in a circumferential direction, between the recesses and the internal toothing of a respective one of the laminated cores, that is different from the circumferential orientation of the second laminated core;
    wherein the circumferential orientation of the first laminated core and the circumferential orientation of the second laminated core have an offset in the circumferential direction from one another that is different from a tooth distance or a multiple of the tooth distance of the internal toothing; and
    wherein the offset is equal to half the tooth distance or the sum of a multiple of the tooth distance and half the tooth distance.

2. The laminated core set according to claim 1, wherein the laminated core set has a plurality of the first laminated cores, each having an identical first lamination cross-section shape taken in a direction perpendicular to an axial direction, and a plurality of the second laminated cores, each having an identical second lamination cross-section shape taken in a direction perpendicular to an axial direction, and the first lamination cross-section shape is different from the second lamination cross-section shape.

3. The laminated core set according to claim 1, further comprising a third laminated core having internal toothing configured for fastening to the rotor shaft in a form-fitting manner secured against rotation and forming a magnet carrier constructed from a plurality of rotor laminations stacked axially one above the other, the circumferential orientation of the third laminated core is different from the circumferential orientation of the first laminated core and different from the circumferential orientation of the second laminated core.

4. The laminated core set according to claim 3, wherein the circumferential orientation of the first laminated core and the circumferential orientation of the second laminated core have a first offset from one another corresponding to one third of the tooth distance, and the circumferential orientation of the first laminated core and the circumferential orientation of the third laminated core have a second offset from one another corresponding to two thirds of the tooth distance.

5. A rotor for an electric machine having the laminated core set according to claim 1 and a rotor shaft to which the laminated core set is attached such that the recesses of axially adjacent ones of the first and second laminated cores are arranged rotated by a predetermined angular offset.

6. The rotor according to claim 5, wherein there are a plurality of the first laminated cores and a plurality of the second laminated cores are regularly alternately attached to the rotor shaft in the axial direction, and at least one of the plurality of first laminated cores or the plurality of second laminated cores are each arranged rotated by a tooth distance or a multiple of the tooth distance of the internal toothing in the circumferential direction.

7. The rotor according to claim 6, wherein at least one of the rotation of the plurality of first laminated cores with respect to one another or the rotation of the plurality of second laminated cores with respect to one another corresponds to twice the offset between the circumferential orientation of the first laminated core and the circumferential orientation of the second laminated core.

8. A rotor for an electric machine comprising:
    a laminated core set; and
    a rotor shaft to which the laminated core set is attached;
    wherein the laminated core set includes:
        a first laminated core;
        a second laminated core;
        the first and second laminated cores each having internal toothing configured for fastening to a rotor shaft in a form-fitting manner secured against rotation and forming a magnet carrier constructed from a plurality of rotor laminations stacked axially one above the other; the magnet carriers have recesses for receiving magnets; and
        wherein the first laminated core has a circumferential orientation, which is a relative position, viewed in a circumferential direction, between the recesses and the internal toothing of a respective one of the laminated cores, that is different from the circumferential orientation of the second laminated core;
    wherein the laminated core set is attached such that the recesses of axially adjacent ones of the first and second laminated cores are arranged rotated by a predetermined angular offset; and wherein the predetermined angular offset corresponds to the offset between the circumferential orientation of the first laminated core and the circumferential orientation of the second laminated core.

9. A laminated core set for a rotor of an electric machine, the laminated core set comprising:
a first laminated core;
a second laminated core;
the first and second laminated cores each having identical internal toothing in an assembled state configured for fastening to a rotor shaft in a form-fitting manner secured against rotation and forming a magnet carrier constructed from a plurality of rotor laminations stacked axially one above the other;
the magnet carriers have recesses for receiving magnets;
wherein the first laminated core has a circumferential orientation, which is a relative position, viewed in a circumferential direction, between the recesses and the internal toothing of a respective one of the laminated cores, that is different from the circumferential orientation of the second laminated core such that the recesses of the first laminated core are circumferentially offset from the recesses of the second laminated core;
wherein the circumferential orientation of the first laminated core and the circumferential orientation of the second laminated core have an offset in the circumferential direction from one another that is different from a tooth distance or a multiple of the tooth distance of the internal toothing; and
wherein the offset is equal to half the tooth distance or the sum of a multiple of the tooth distance and half the tooth distance.

10. The laminated core set according to claim 9, wherein the laminated core set has a plurality of the first laminated cores, each having an identical first lamination cross-section shape taken in a direction perpendicular to an axial direction, and a plurality of the second laminated cores, each having an identical second lamination cross-section shape taken in a direction perpendicular to an axial direction, and the first lamination cross-section shape is different from the second lamination cross-section shape.

11. The laminated core set according to claim 9, further comprising a third laminated core having internal toothing configured for fastening to the rotor shaft in a form-fitting manner secured against rotation and forming a magnet carrier constructed from a plurality of rotor laminations stacked axially one above the other, the circumferential orientation of the third laminated core is different from the circumferential orientation of the first laminated core and different from the circumferential orientation of the second laminated core.

12. The laminated core set according to claim 11, wherein the circumferential orientation of the first laminated core and the circumferential orientation of the second laminated core have a first offset from one another corresponding to one third of the tooth distance, and the circumferential orientation of the first laminated core and the circumferential orientation of the third laminated core have a second offset from one another corresponding to two thirds of the tooth distance.

13. A rotor for an electric machine having the laminated core set according to claim 9 and a rotor shaft to which the laminated core set is attached such that the recesses of axially adjacent ones of the first and second laminated cores are arranged rotated by a predetermined angular offset.

14. The rotor according to claim 13, wherein the predetermined angular offset corresponds to the offset between the circumferential orientation of the first laminated core and the circumferential orientation of the second laminated core.

15. The rotor according to claim 13, wherein there are a plurality of the first laminated cores and a plurality of the second laminated cores are regularly alternately attached to the rotor shaft in the axial direction, and at least one of the plurality of first laminated cores or the plurality of second laminated cores are each arranged rotated by a tooth distance or a multiple of the tooth distance of the internal toothing in the circumferential direction.

16. The rotor according to claim 15, wherein at least one of the rotation of the plurality of first laminated cores with respect to one another or the rotation of the plurality of second laminated cores with respect to one another corresponds to twice the offset between the circumferential orientation of the first laminated core and the circumferential orientation of the second laminated core.

* * * * *